(12) United States Patent
Khaladkar et al.

(10) Patent No.: US 8,001,468 B2
(45) Date of Patent: Aug. 16, 2011

(54) METHOD AND SYSTEM FOR ACCELERATING TEST AUTOMATION OF SOFTWARE APPLICATIONS

(75) Inventors: Sunil Khaladkar, Bangalore (IN); Peter Zencke, Gorxheimertal (DE)

(73) Assignee: SAP AG, Walldorf (DE)

( * ) Notice: Subject to any disclaimer, the term of this patent is extended or adjusted under 35 U.S.C. 154(b) by 403 days.

(21) Appl. No.: 11/858,114

(22) Filed: Sep. 19, 2007

(65) Prior Publication Data
US 2009/0077422 A1 Mar. 19, 2009

(51) Int. Cl.
*G06F 11/00* (2006.01)
(52) U.S. Cl. .......................................... 715/704; 714/37
(58) Field of Classification Search .................. 707/102; 714/38; 717/124
See application file for complete search history.

(56) References Cited

U.S. PATENT DOCUMENTS

| | | | | |
|---|---|---|---|---|
| 5,157,779 A * | 10/1992 | Washburn et al. | ............... | 714/37 |
| 5,781,720 A * | 7/1998 | Parker et al. | ..................... | 714/38 |
| 6,184,880 B1 * | 2/2001 | Okada | ........................... | 715/704 |
| 6,502,102 B1 * | 12/2002 | Haswell et al. | ............... | 707/102 |
| 7,421,683 B2 * | 9/2008 | Robertson et al. | ............ | 717/130 |
| 7,451,403 B1 * | 11/2008 | Srinivasan et al. | ............ | 715/763 |
| 7,627,821 B2 * | 12/2009 | Klementiev | .................. | 715/704 |
| 2003/0055836 A1 * | 3/2003 | Dubovsky | ..................... | 707/102 |
| 2003/0231205 A1 * | 12/2003 | Shima et al. | ................... | 345/744 |
| 2004/0002996 A1 * | 1/2004 | Bischof et al. | ............. | 707/104.1 |
| 2004/0041827 A1 * | 3/2004 | Bischof et al. | ................ | 345/704 |
| 2005/0021289 A1 * | 1/2005 | Robertson et al. | ............ | 702/182 |
| 2005/0278728 A1 * | 12/2005 | Klementiev | ................. | 719/328 |
| 2006/0005132 A1 * | 1/2006 | Herdeg, III | .................... | 715/704 |
| 2006/0059433 A1 * | 3/2006 | McGlinchey et al. | ........ | 715/771 |
| 2006/0230319 A1 * | 10/2006 | Ryali et al. | ....................... | 714/38 |
| 2008/0086627 A1 * | 4/2008 | Splaine et al. | ................ | 712/227 |
| 2008/0092119 A1 * | 4/2008 | Sweis | ............................ | 717/124 |
| 2008/0250051 A1 * | 10/2008 | Grechanik et al. | ............ | 707/102 |
| 2009/0133000 A1 * | 5/2009 | Sweis et al. | .................... | 717/124 |

FOREIGN PATENT DOCUMENTS
WO    WO 2006132564 A1 * 12/2006

OTHER PUBLICATIONS

McCaffrey, ".Net Test Automation Recipes: A problem solution approach", 2006, Apress, pp. 167-184.*
Meszaros, "Agile regressioni testing using record & playback", Oct. 2003, ACM, pp. 353-360.*

* cited by examiner

*Primary Examiner* — Robert W Beausoliel, Jr.
*Assistant Examiner* — Jeison C Arcos

(57) ABSTRACT

Disclosed is a method and system for capturing a user action on a user interface and fetching user interface elements in the user interface into a first list and operations of the user interface elements into a second list. A test case for the user action is created in an automation accelerator by selecting a user interface element from the first list and an operation of the user interface element from the second list. An automation accelerator script of the test case is created by the automation accelerator.

19 Claims, 12 Drawing Sheets

METHOD AND SYSTEM FOR ACCELERATING TEST AUTOMATION OF SOFTWARE APPLICATIONS

FIELD OF THE INVENTION

The invention generally relates to the field of testing software applications and more specifically to a way of accelerating a test automation process.

BACKGROUND OF THE INVENTION

The process of testing software applications is typically a manual process. A user writes a test case in human readable format in a test case document and follows this test case while testing the software application. The manual process of testing is typically a tedious and time consuming process. Also, the manual process may be prone to error since a person may tend to make a mistake while writing the test case in the test case document or a user testing the software application may tend to make a mistake in reading the test case document and performing the test.

To eliminate the above problems, an automated testing process for user interface of software applications was introduced. In automated testing process, test automation tools were used that typically could automate the testing process. In the automated testing process using the test automation tool, the user creates a test case in the test automation tool and the test automation tool performs the testing of the software application by executing the test case. The test case is typically written in a programming language understood by the test automation tool. Such a test automation tool typically requires a skilled user as it demands the user to have knowledge of the programming language understood by the test automation tool. Moreover, it is tedious and time consuming to write the test case in the programming language of the test automation tool. Also, test automation tools typically only identify standard user interface elements such as inputbox, dropdown list, checkbox, and radio button with standard properties such as width, height, number of characters. Test automation tools may not identify customized user interface elements such as the user interface elements having additional properties. For example, if a customized inputbox has additional properties such as background color, background pattern, the test automation tool may not identify the customized inputbox.

SUMMARY OF THE INVENTION

What is described is a method and system for capturing a user action on a user interface and fetching user interface elements in the user interface into a first list and operations of the user interface elements into a second list. A test case for the user action is created in an automation accelerator by selecting a user interface element from the first list and an operation of the user interface element from the second list. An automation accelerator script of the test case is created by the automation accelerator.

DETAILED DESCRIPTION

What is described is a method and system for capturing a user action on a user interface and fetching user interface elements in the user interface into a first list and operations of the user interface elements into a second list. A test case for the user action is created in an automation accelerator by selecting a user interface element from the first list and an operation of the user interface element from the second list. An automation accelerator script of the test case is created by the automation accelerator. The automation accelerator script may be executed by the automation accelerator to execute the test case on a software application. The automation accelerator generates a test report containing a result of execution of the test case.

Figure 1:
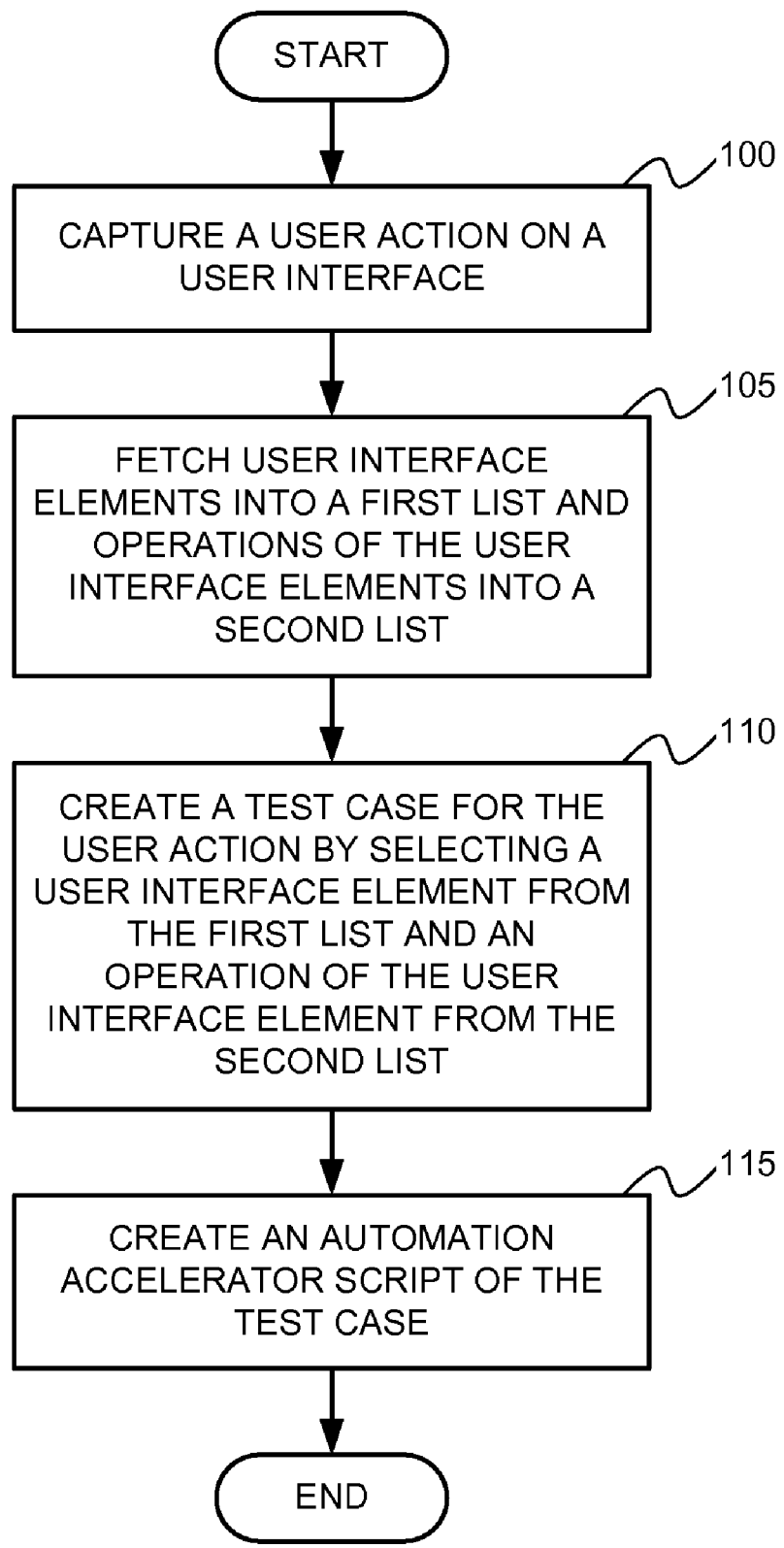
FIG. 1 is a flow diagram to create an automation accelerator script of a test case according to an embodiment of the invention.

FIG. 1 is a flow diagram to create an automation accelerator script of a test case according to an embodiment of the invention. At step 100, a user action on a user interface (UI) in a software application is captured. The user action may include setting the value of a UI element, an action on a drop down list, setting the value of a radio button, and clicking a button. At step 105, UI elements in the user interface are fetched into a first list and operations of the UI elements are fetched into a second list. At step 110, a test case for the user action captured in step 100 is created by selecting a UI element from the first list and an operation of the UI element from the second list. Selecting the UI element from the first list involves selecting a UI element on which the user action is performed. Selecting the operation of the UI element from the second list involves selecting an operation of the UI element performed in the user action. At step 115, an automation accelerator script of the test case is created.

Figure 2:
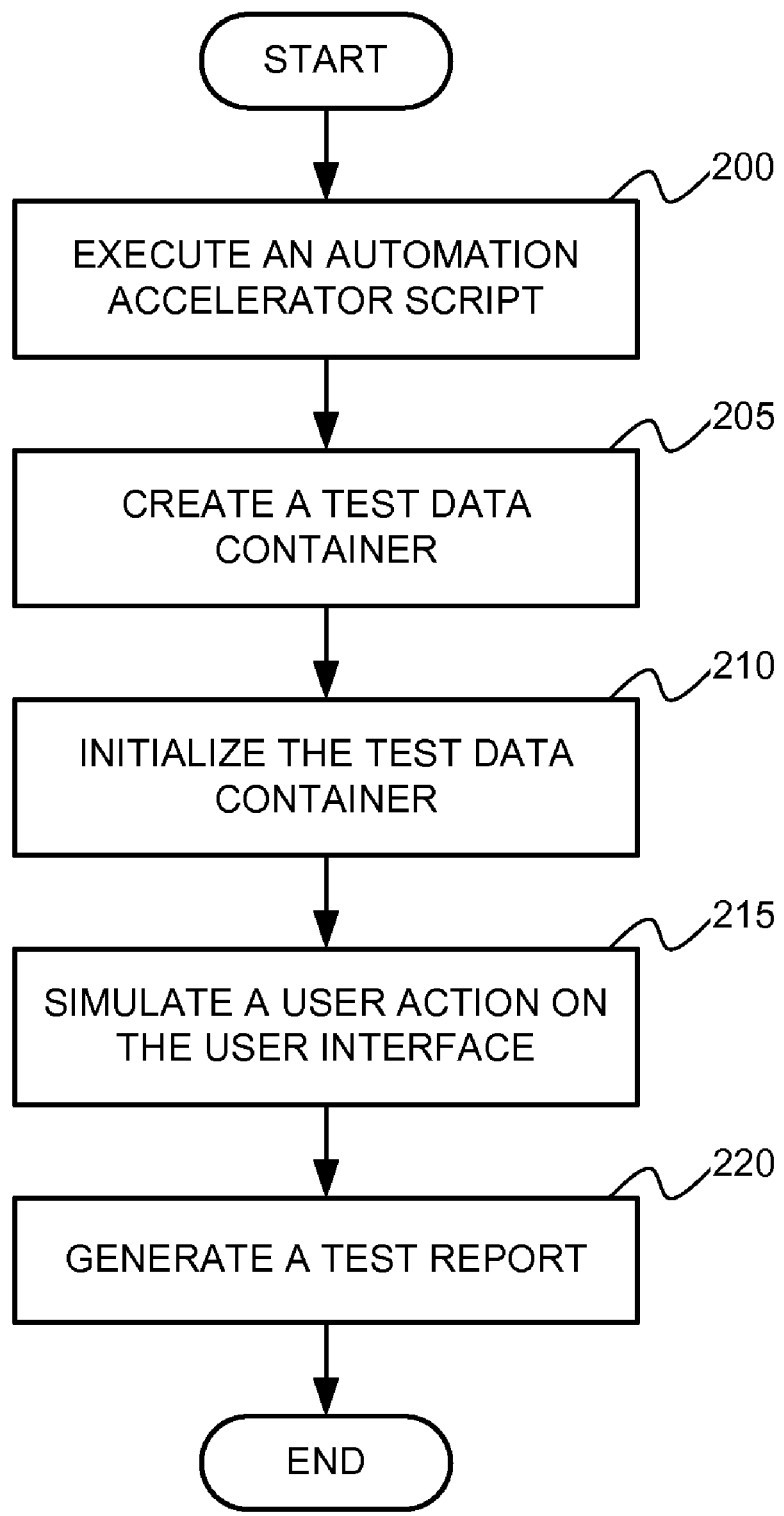
FIG. 2 is a flow diagram to execute a test case by an automation accelerator on a user interface according to an embodiment of the invention.

FIG. 2 is a flow diagram to execute a test case by an automation accelerator on a user interface according to an embodiment of the invention. At step 200, an automation accelerator script is executed in the automation accelerator to execute the test case on the software application. At step 205, a test data container is created that contains a test data entered by a user while performing the user action on the UI. At step 210, the test data container is initialized with the test data. At step 215, the user action on the UI is simulated by the automation accelerator. The simulation of the user action involves performing the user action on the UI that is captured in step 100 (as described in FIG. 1). The user action may include setting the value of a UI element, an action on a drop down list, setting the value of a radio button, and clicking a button. At step 220, a test report is generated that contains a result of the execution of the test case.

Figure 3:
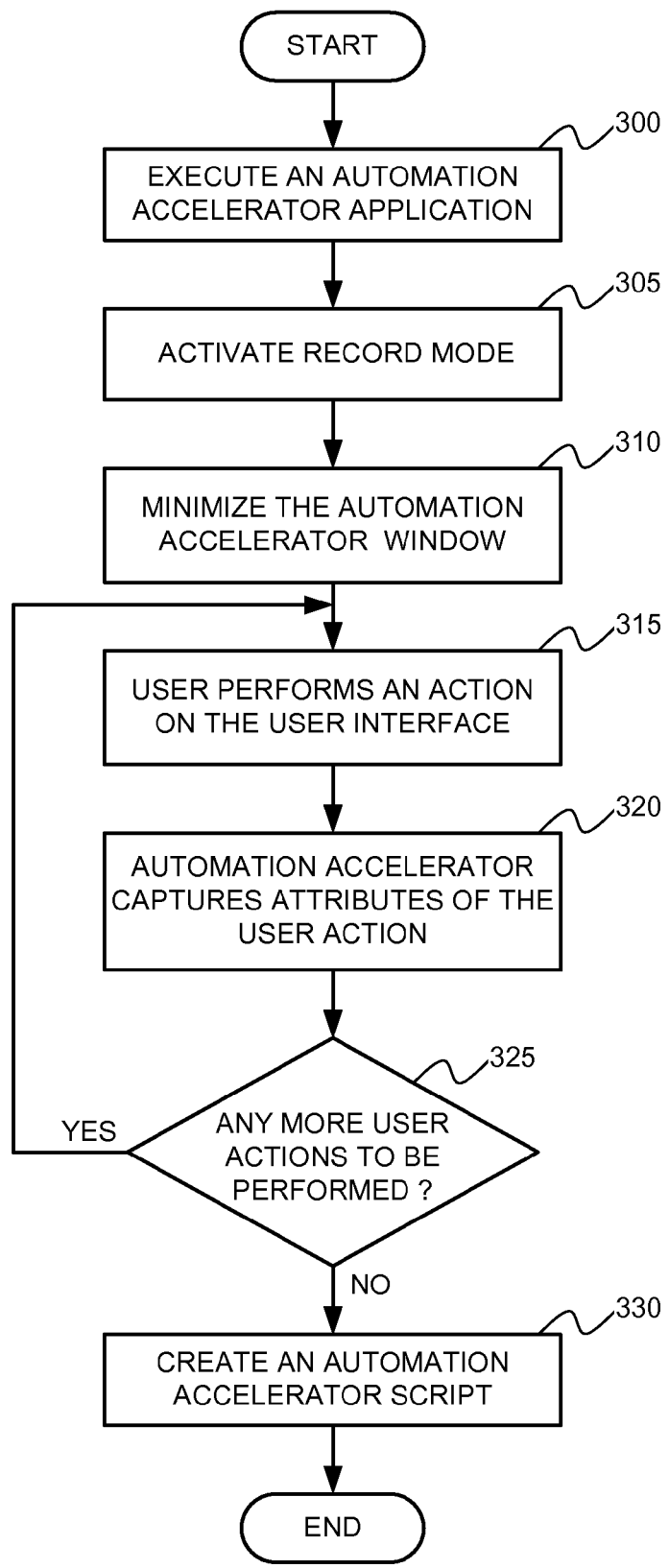
FIG. 3 is a flow diagram to create an automation accelerator script by executing automation accelerator in record mode according to an embodiment of the invention.

FIG. 3 is a flow diagram to create an automation accelerator script by executing automation accelerator in record mode according to an embodiment of the invention. At step 300, the automation accelerator is executed. At step 305, a record mode of the automation accelerator is activated. At step 310, the automation accelerator window is minimized. At step 315, a user performs a user action on the UI of the software application. At step 320, the user action is captured by the automation accelerator automatically. The automation accelerator captures attributes of the user action such as the UI element on which the user action is performed, the operation performed on the UI element, and a value of the UI element. A test case containing the user action is created automatically in the automation accelerator, that is, without any user intervention.

At 325, the automation accelerator checks if there are any more user actions to be performed. If yes, then the automation accelerator performs the steps from step 315 to step 325, that is, the automation accelerator captures attributes of all the user actions performed on the UI and adds the user action to the test case. If there are no more user actions to be captured, the automation accelerator script is created at step 330. The automation accelerator script for the test case may be created by using, for example, a save button.

Figure 4:
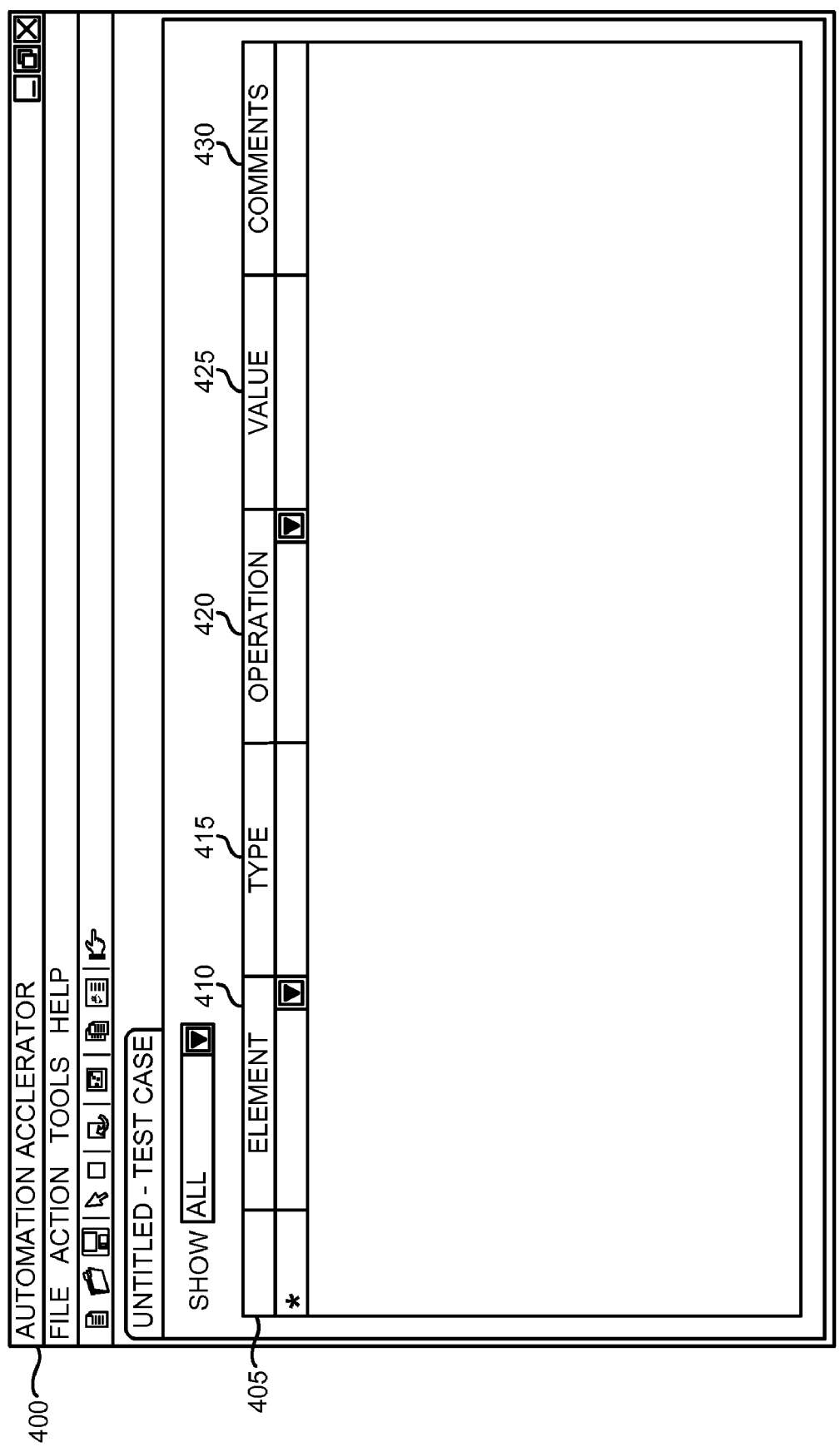
FIG. 4 is an example screen display of a user interface of an automation accelerator according to an embodiment of the invention.

FIG. 4 is an example screen display of a user interface of an automation accelerator application according to an embodiment of the invention. A user action has a set of attributes that may be captured by automation accelerator 400. Automation accelerator 400 includes a user action table 405 that contains attributes of the user action such as UI element 410, type 415 of UI element 410, operation 420 performed on UI element 410, value 425 of UI element 410, and comments 430 of the user action.

UI element 410 specifies name of the UI element in the UI of the software application on which the user action is performed. Type 415 specifies a type of UI element 410. Type 415 includes UI elements such as button, radio, checkbox, dropdown list, input box and hyperlink. Operation 420 is the operation performed on the UI element 410 in the user action which includes operations such as click, set, and launch. Value 425 contains a value of UI element 410 and comments 430 contains comments on the user action. The fields, UI element 410, type 415, and operation 420 are mandatory fields, that is, the fields must be provided with values in user action table 405 where as the fields, value 425 and comments 430 are not mandatory fields which may not have values. User action table 405 may be updated with the attributes of all the user action performed on the UI.

Figure 5:
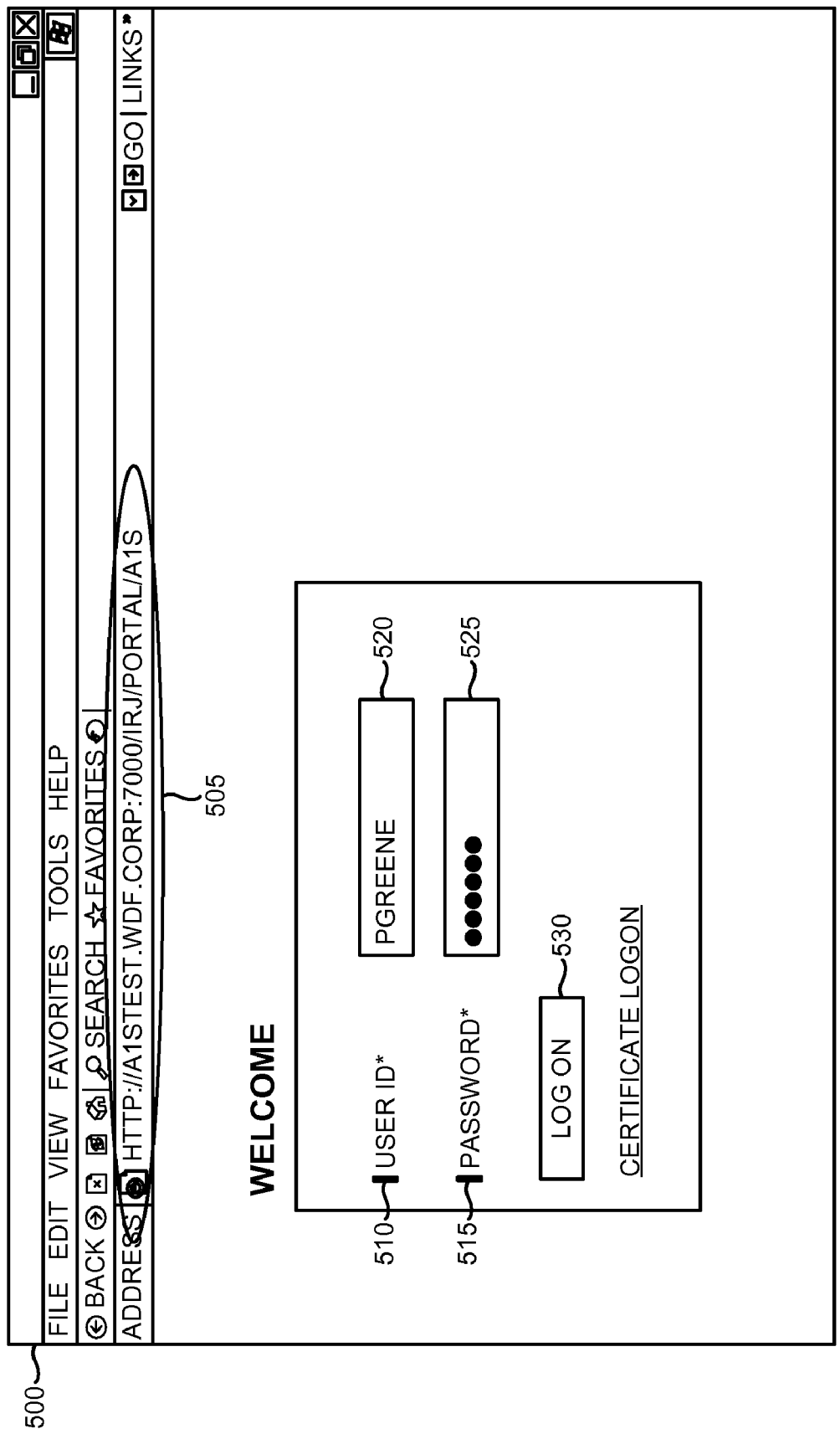
FIG. 5 is an example screen display of a login user interface of a software application.

FIG. 5 is an example screen display of a login user interface of a software application. Login User interface 500 is a web page of a software application that allows a user to log into the software application by entering a user name and a password. Login UI 500 contains UI elements such as user ID 510, password 515, and Log on button 530. A user may perform the following four user actions on login UI 500.

In a first user action, the user may launch login UI 500 by typing a uniform resource locator (URL) 505 in a web browser.

In a second user action, the user may provide a value for user ID 510 as "pgreene" 520.

In a third user action, the user may provide a value for password 515 which is displayed as " . . . " 525.

In a fourth user action, the user may log on to the software application by clicking "Log on" button 530.

Figure 6:
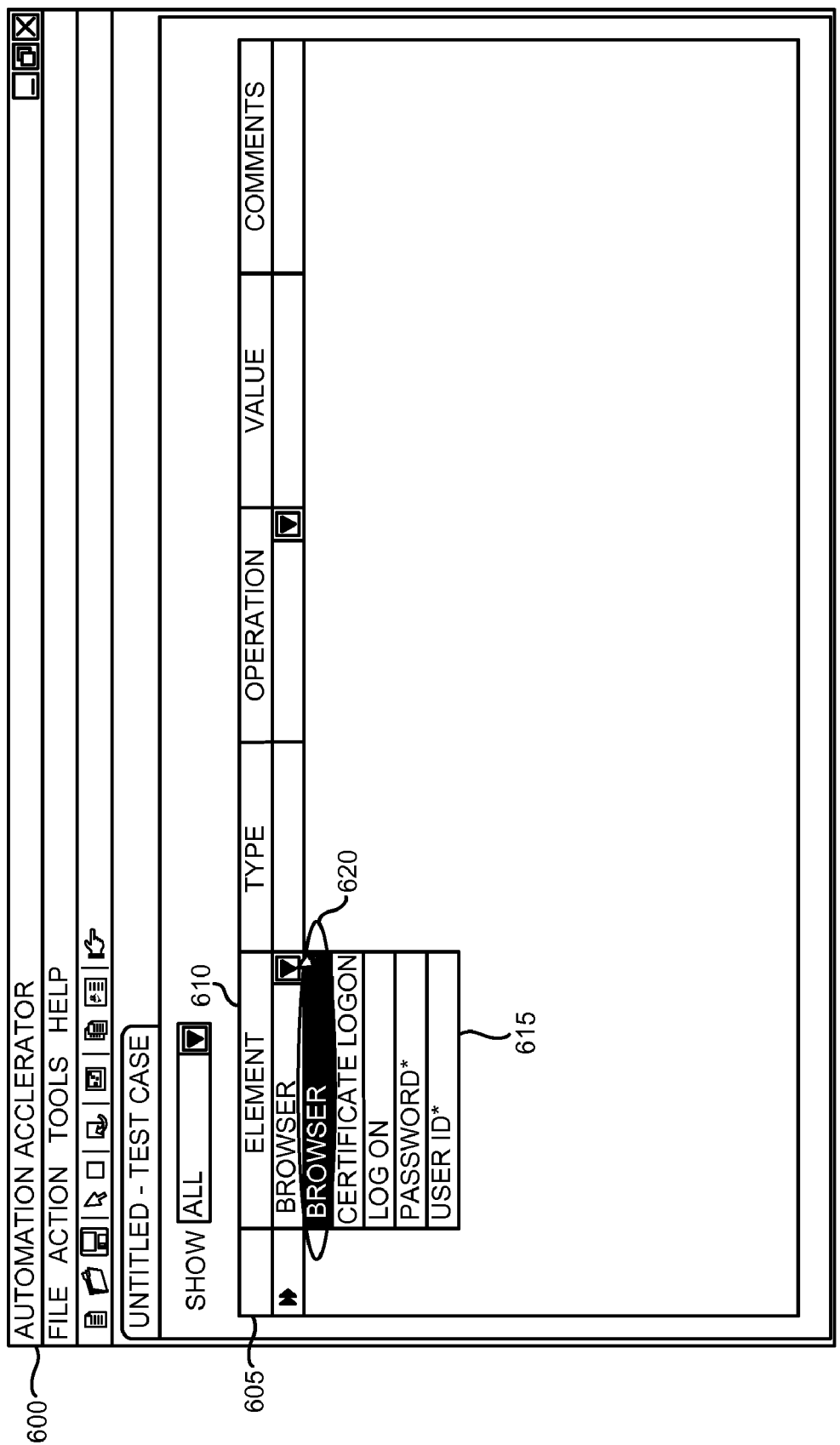
FIG. 6 is an example screen display of an automation accelerator to capture an attribute of a user action on the login user interface according to an embodiment of the invention.

FIG. 6 is an example screen display of automation accelerator to capture an attribute of a user action on the login user interface according to an embodiment of the invention. The four user actions described in FIG. 5 may be captured by automation accelerator 600 in user action table 605. For example, the first user action in FIG. 5 which describes about launching a login UI 500 in a web browser may be captured in automation accelerator 600 by capturing attributes of the first user action such as name of UI element 610 which is "Browser" 620.

The attribute of the first user action such as name of UI element 610 which is "Browser" 620 may be selected from UI element dropdown list 615. UI element drop down list 615 contains a list of all UI elements in login UI 500.

Figure 7:
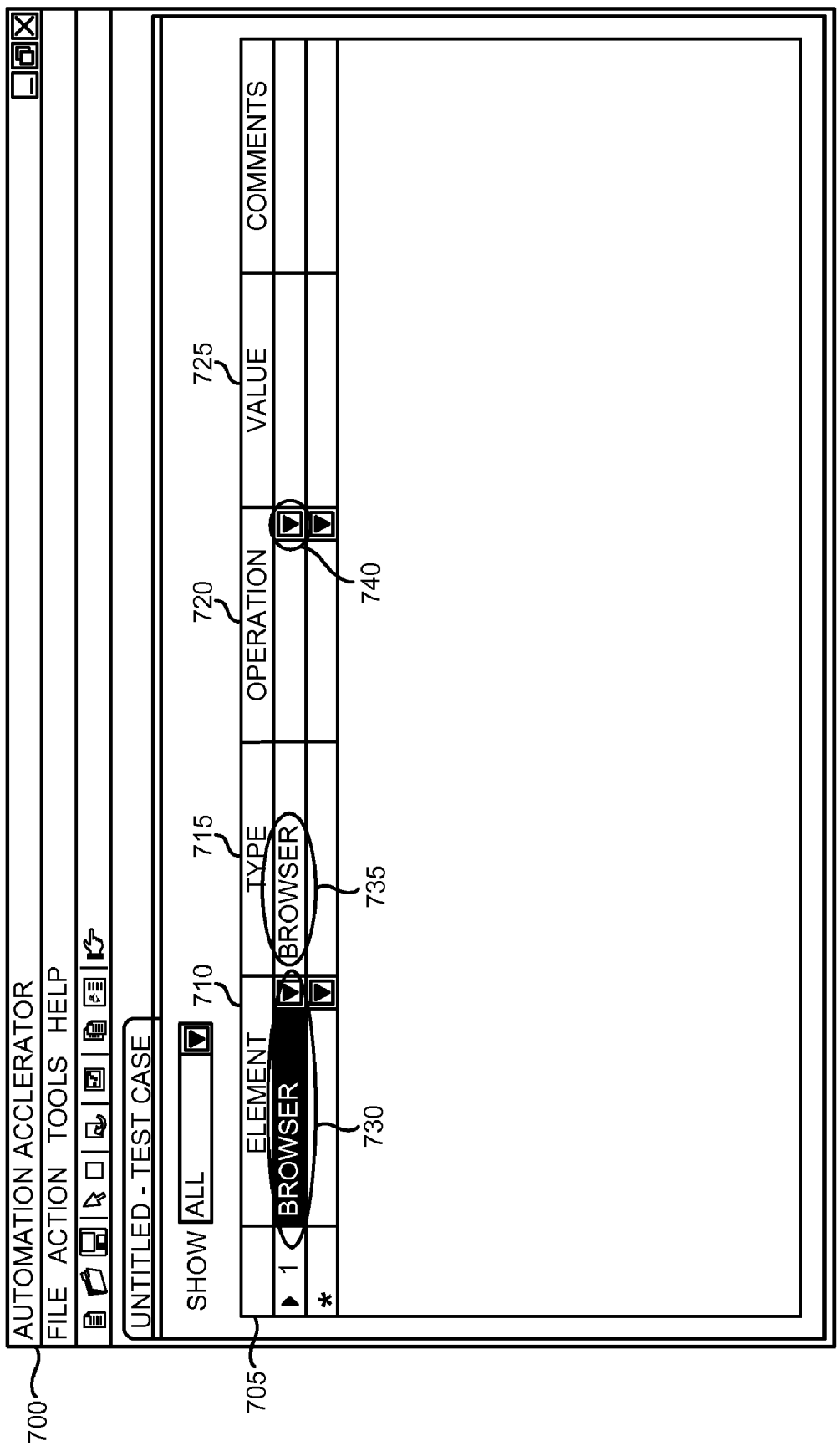
FIG. 7 is an example screen display of automation accelerator to capture the attribute of the user action on login user interface according to an embodiment of the invention.

FIG. 7 is an example screen display of automation accelerator to capture the attribute of the user action on login user interface according to an embodiment of the invention. On selecting the name of UI element 710 in user action table 705, automation accelerator 700 automatically updates type 710 of UI element 710. Since UI element 710 is "Browser" 730, type 715 of UI element 710 is updated as "Browser" 735. Similarly, other attributes of the first user action such as operation 720 is updated by selecting an operation of UI element 710 from operation dropdown list 740 and value 725 of UI element 710 is updated with URL 505 by automation accelerator 700.

Figure 8:
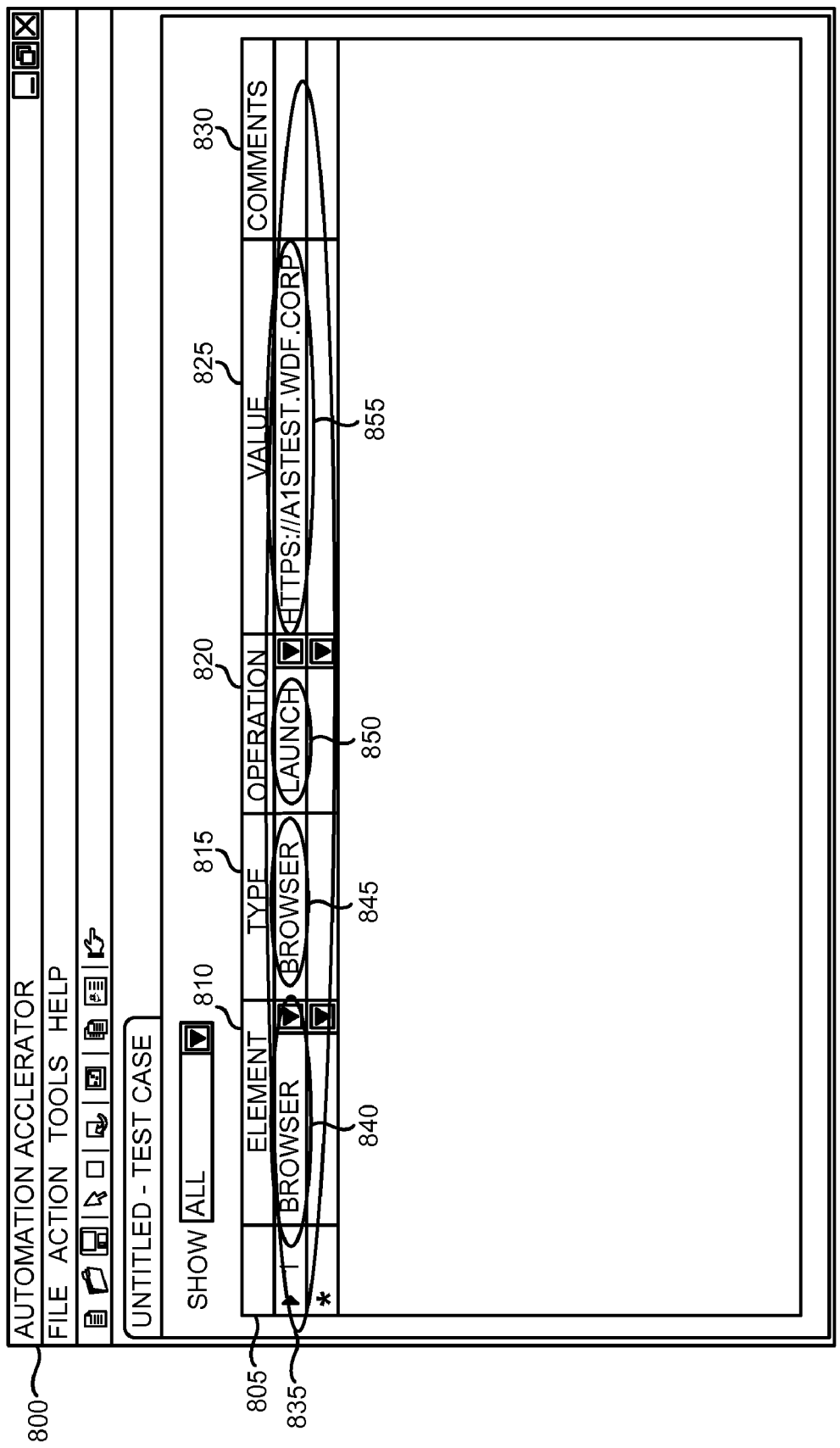
FIG. 8 is an example screen display of automation accelerator that displays attributes of a user action on login user interface captured by automation accelerator according to an embodiment of the invention.

FIG. 8 is an example screen display of automation accelerator that displays attributes of a user action on login user interface captured by automation accelerator according to an embodiment of the invention. Automation accelerator 800 includes a user action table 805 that contains user action 835. The first user action on login UI 500 is captured as user action 835 in user action table 805. All the attributes of the first user action such as name of the UI element on which the user action is performed, the type of the UI element, an operation performed on the UI element, a value of the UI element, and comments are captured in user action 835 as name of UI element 810, type 815, operation 820, value 825, and comments 830 respectively.

The name of UI element 810 on which the first user action is performed is captured as "Browser" 840, type 815 of UI element 810 is updated by automation accelerator 900 as "Browser" 845, operation 820 performed on "Browser" 840 is captured as "Launch" 850 and a value 825 of "Browser" 840 is set as "https://a1stest.wdf.corp/" 855 by automation accelerator 900. Each row in user action table 805 corresponds to the user action performed on login UI 500. A set of such user actions in user action table 805 form a test case.

Figure 9:
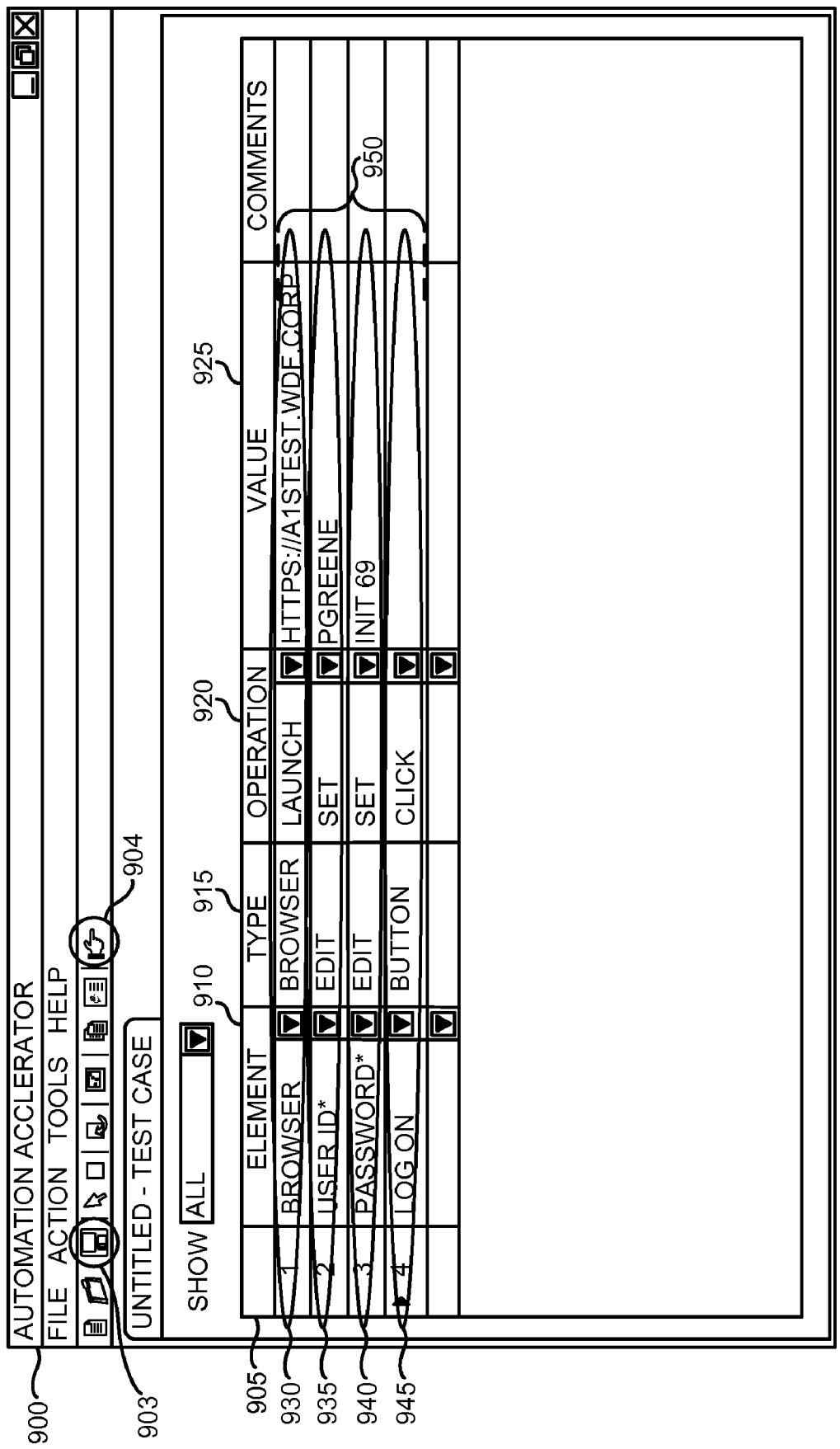
FIG. 9 is an example screen display of automation accelerator to create an automation accelerator script for a test case according to an embodiment of the invention.

FIG. 9 is an example screen display of automation accelerator to create an automation accelerator script for a test case according to an embodiment of the invention. Automation accelerator 900 includes a user action table 905 that contains four user actions user action 930, user action 935, user action 940, and user action 945 represents the four user actions performed on login UI 500 as described in FIG. 5.

The below four user actions form test case 950 for testing the login functionality of login UI 500.

User action 930 describes the attributes of the first user action performed on login UI 500 which involves launching login UI 500 in a web browser using URL 505. The attributes of the first user action such as name of UI element 910, type 915 of UI element 910, operation 920 of UI element 910, and value 925 of UI element 945 are captured as "Browser", "Browser", "Launch", and "https://a1stest.wdf.corp/" respectively in user action 930.

User action 935 describes the attributes of second user action performed on login UI 500 which involves providing a value to the user ID. The attributes of the second user action such as name of UI element 910, type 915 of UI element 910, operation 920 of UI element 910, and value 925 of UI element 945 are captured as "User ID", "Edit", "Set", and "PGREENE" respectively in user action 935. Type 915 "Edit" signifies that UI element 910 "User ID" is an editable field in the UI and operation 920 "Set" signifies that UI element 910 "User ID" is set to value 925 "pgreene".

User action 940 describes the attributes of third user action performed on login UI 500 which involves providing a value to password. The attributes of the third user action such as name of UI element 910, type 915 of UI element 910, operation 920 of UI element 910, and value 925 of UI element 945 are captured as "Password", "Edit", "Set", and "INIT69" respectively in user action 940.

User action 945 describes the attributes of fourth user action performed on login UI 500 which involves logging into the application by clicking the log on button 530. The attributes of the fourth user action such as name of UI element 910, type 915 of UI element 910, and operation 920 of UI element 910 are captured as "Log on", "Button", and "Click" respectively in user action 945. Log on button 530 may not have a value attribute associated to it and thus value 925 is null in user action 945.

All the above user actions may be the necessary user actions to be performed by the user to login to the software application. The user actions may be captured in the automation accelerator 900 while the user is performing the user action on login UI 500 or the user actions may be captured in automation accelerator 900 independently, that is, the user may update the attributes of the user action in automation accelerator 900 without actually performing the user actions on login UI 500. After capturing the above four user actions in automation accelerator 900, the user may save test case 950 using save button 903. When test case 950 is saved, an automation accelerator script is generated by automation accelerator 900. The automation accelerator script is an extensible markup language (XML) file containing test case 950.

The automation accelerator script may be opened in automation accelerator 900 and executed by automation accelerator 900. On executing the automation accelerator script, automation accelerator 900 executes the test case 950 on login UI 500 automatically. Once, the automation accelerator script is executed by automation accelerator 900, typically no further human intervention is required to perform the testing of login UI 500 as automation accelerator simulates the user actions on login UI 500 automatically.

Automation accelerator 900 may also be executed in a record mode. In the record mode, automation accelerator window is minimized or executed in the background. Automation accelerator records the user actions performed on login UI 500 by automatically capturing the attributes of the user actions in user action table 905. Automation accelerator 900 automatically identifies the name of the UI element, the operation of the UI element and the value of UI element on which the user action is performed and updates the attributes of the user actions in user action table 905. After performing the user actions on the login UI 500, the user may deactivate the record mode and save test case 950 in automation accelerator 900. In record mode, no human intervention may be required for capturing the user actions to create test case 950 in automation accelerator 900.

The user may specify to automation accelerator 900, login UI 500 for which test case 950 may be created by using pointer button 904. For example, the user may click on pointer button 904 via a pointing device, then switch to login UI 500 and click on login UI 500 again. Automation accelerator 900 identifies login UI 500 as the UI for which a test case may be created and builds a list of UI elements and a list of operations for the UI elements in login UI 500 which are required to create user actions in automation accelerator 900.

Automation accelerator 900 may execute test case 950 completely or partially, that is, automation accelerator 900 may execute all the user actions in test case 950 or only a selected group of the user actions. The user may specify the group of user actions to be tested in login UI 500 by specifying a start point and an end point in the test case. All the user actions between the start point and the end point may be executed by automation accelerator 900. For example, the user may specify user action 935 as start point of test case 950 and user action 940 as the end point of test case 950. Automation accelerator 900 would only execute user action 935 and user action 940 when the automation accelerator script is executed.

Figure 10:
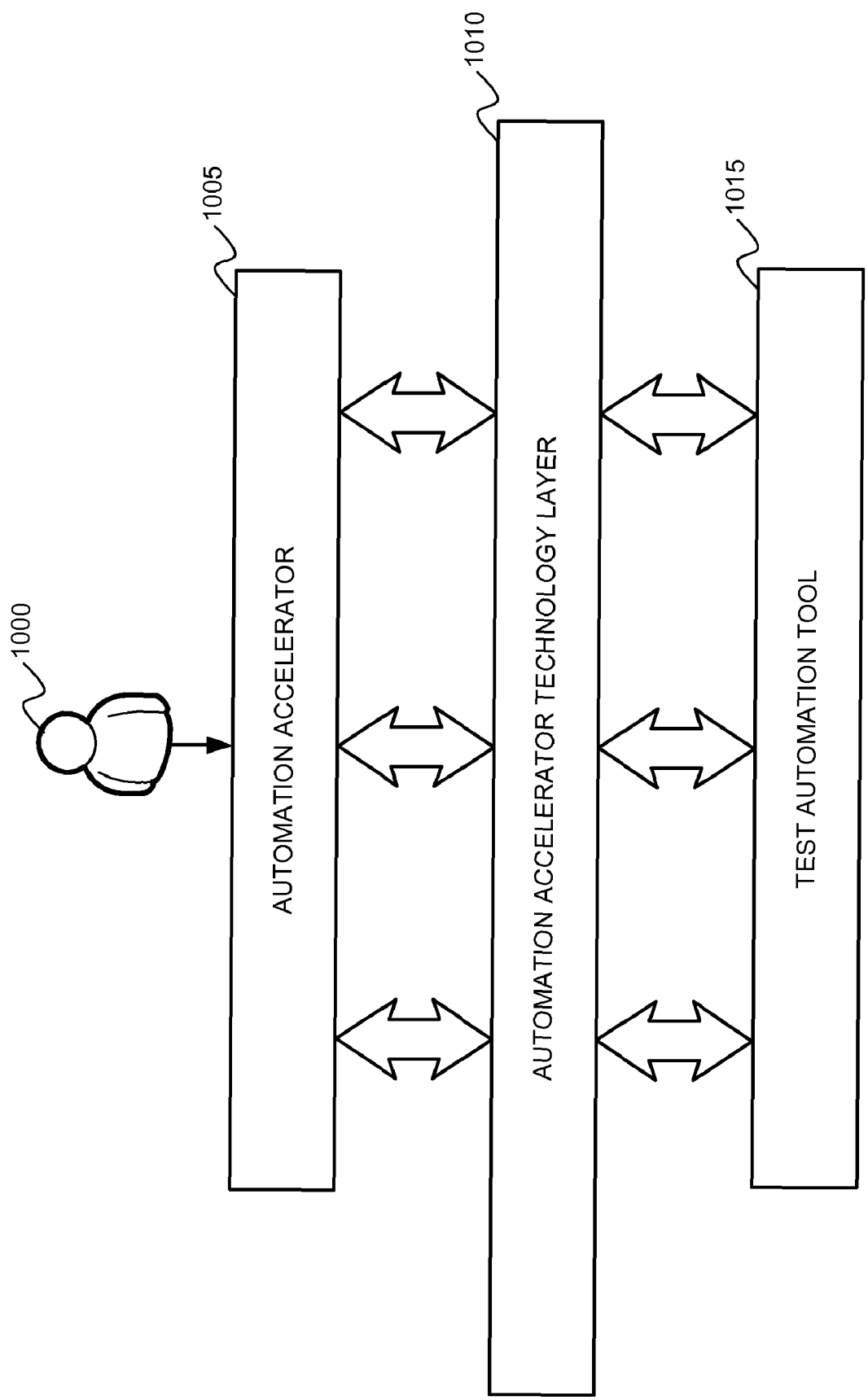
FIG. 10 is a block diagram for integrating an automation accelerator with a test automation tool according to an embodiment of the invention.

FIG. 10 is a block diagram for integrating an automation accelerator with a test automation tool according to an embodiment of the invention. Automation accelerator 1005 may be integrated with test automation tool 1015 such as quick test professional (QTP) provided by Hewlett Packard and Mercury Management. Test automation tool 1015 provides an application programming interface (API) for identifying UI elements in a UI of a software application, for identifying operations of the UI elements and for creating a test case. Automation accelerator 1005 is integrated with test automation tool 1015 using automation accelerator technology layer 1010. Automation accelerator technology layer 1010 typically consists of API of automation accelerator 1005 that may communicate with the API of test automation tool 1015.

Automation accelerator 1005 communicates with test automation tool 1015 via automation accelerator technology layer 1010 to fetch UI elements into a first list and operations of the UI elements into a second list when user 1000 identifies the UI for which a test case may be created. Automation accelerator 1005 communicates with test automation tool 1015 to simulate user actions on the UI when automation accelerator script is executed. Automation accelerator 1005 allows user 1000 to create the test case in a declarative way unlike test automation tool 1015 wherein user 1000 typically has to create the test case by writing a code for the test case in a programming language understood by test automation tool 1015. Automation accelerator 1005 typically eliminates the need to know a programming language specific to test automation tool 1015.

Also, automation accelerator 1005 may be customized to identify customized UI elements in the UI unlike test automation tool 1015 which typically identifies only standard UI elements. Standard UI elements are UI elements such as inputbox, drop down list, radio button and checkbox with standard properties such as width, height, and number of characters. If inputbox is customized to have one or more additional properties such as background style of inputbox that are not part of the standard properties, test automation tool 1015 typically does not identify the customized inputbox. Automation accelerator 1005 may be programmed to have the API that may identify customized UI elements.

Figure 11:
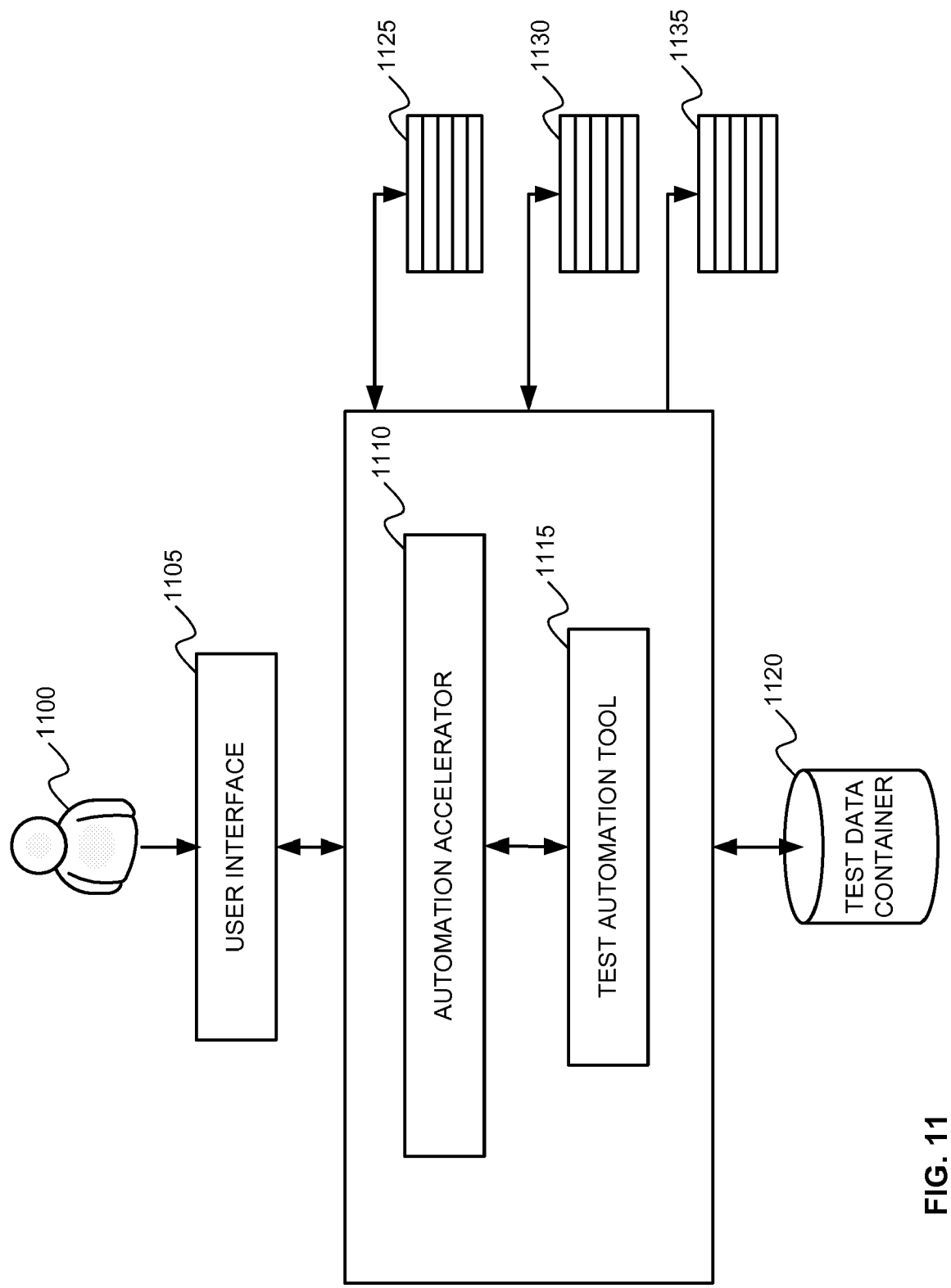
FIG. 11 is a block diagram for creating an automation accelerator script and executing a test case on a user interface according to an embodiment of the invention.

FIG. 11 is a block diagram for creating an automation accelerator script and executing a test case on a user interface according to an embodiment of the invention. User 1100 specifies user interface 1105 to automation accelerator 1110 for which a test case may be created. Automation accelerator 1110 communicates with test automation tool 1115 to fetch UI elements in user interface 1105 into a first list and operations of the UI elements into a second list. User 1100 may create the test case in automation accelerator 1110 by executing automation accelerator 1110 in record mode and performing user actions on user interface 1105 or user 1100 may create the test case manually in a declarative way, that is, by choosing the UI elements on which the user action is performed from the first list and operations of the UI elements from the second list.

The test case may be saved in automation accelerator 1110. Automation accelerator 1110 persists the test case as an automation accelerator script 1125. Automation accelerator script 1125 is persisted in an XML file format. Automation accelerator script 1125 may also be displayed in human readable format by opening it in automation accelerator 1110. Automation accelerator 1110 also has a feature that allows user 1100 to generate automation tool script 1130 for the test case that is executable by test automation tool 1115. Automation tool script 1130 allows a user 1100 to execute the test case on user interface 1105 by executing automation tool script 1130 in test automation tool 1115. This is particularly useful in a test environment where automation accelerator 1110 is not integrated with test automation tool 1115. Another advantage of the above feature is that user 1100 may create the test case using automation accelerator 1110 which is typically faster and easier than creating a test case in test automation tool 1115.

Test data container 1120 persists values of UI elements specified in the test case in automation accelerator 1110. Automation accelerator 1110 creates test data container when automation accelerator script 1125 is executed and initializes test data container 1120 with the values of the UI elements. Automation accelerator 1110 fetches the values of UI elements from test data container 1120 for simulating the user actions on user interface 1105 to perform the testing. Automation accelerator 1110 generates a test report 1135 that contains a result of execution of the test case. Test report 1135 is generated in a human readable format.

Figure 12:
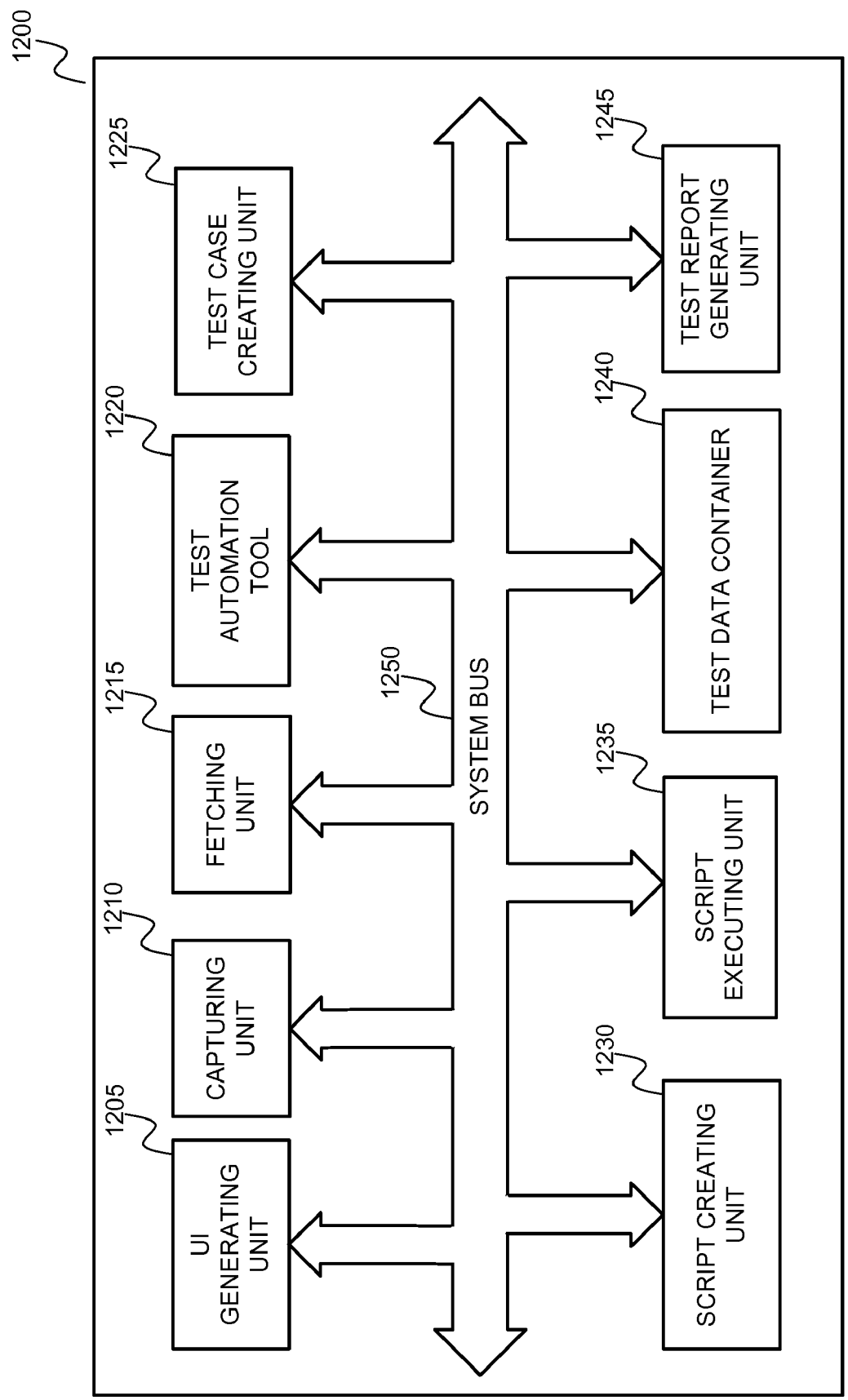
FIG. 12 is a block diagram for creating an automation accelerator script and executing a test case on a user interface according to an embodiment of the invention.

FIG. 12 is a block diagram for creating an automation accelerator script and executing a test case on a user interface according to an embodiment of the invention. Various components of system 1200 such as UI generating unit 1205, capturing unit 1210, fetching unit 1215, test automation tool 1220, test case creating unit 1225, script creating unit 1230, script executing unit 1235, test data container 1240, and test report generating unit 1245 are electronically coupled to a system bus 1250. All components communicate with each other component via system bus 1250. UI generating unit 1205 generates a UI of the software application for which a test case may be created. Capturing unit 1210 communicates with test automation tool 1220 to capture user actions on the UI. Capturing unit 1210 captures attributes of the user actions such as name of UI element on which the user action is performed, type of the UI element, operations of the UI element, and value of the UI element. Fetching unit 1215 communicates with test automation tool 1220 to fetch a list of UI elements in the UI into a first list and operations of the UI elements into a second list. Test case creating unit 1225 creates a test case from the user actions captured using capturing unit 1210. Script creating unit 1230 creates an automation accelerator script and automation tool script for the test case. Script executing unit 1235 executes the automation accelerator script which executes the test case on the UI. Script executing unit 1235 also creates a test data container 1240 that persists value of the UI elements contained in the test case. Test report generating unit 1245 generates a test report that contains a result of the execution of the test case.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or any other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computerized method, comprising:
    capturing a user action on a user interface in a user action table, wherein the user action includes a set of user action attributes, the set of user action attributes including a user interface element, an operation performed on the user interface element in the user action, a type of the user interface element, a value of the user interface element, and comments of the user action, and wherein the operation performed on the user interface element is selected from a group consisting of a click, a set, and a launch;
    fetching the user interface element in the user interface as a first user action attribute into a first list and the operation performed on the user interface element as a second user action attribute into a second list;
    automatically creating a test case without user intervention in an automation accelerator for the captured user action from the user action table by selecting the user interface element from the first list and the operation performed on the user interface element in the user action from the second list;
    automatically updating rest of the set of user action attributes upon selecting the user interface element from the first list and the operation performed on the user interface element from the second list; and
    generating an automation accelerator script of the test case upon a save operation on the test case.

2. The method in claim 1, wherein automatically creating the test case comprises automatically setting the type of the user interface element based on the user interface element selected from the first list.

3. The method in claim 1, further comprising configuring the automation accelerator to execute a part of the test case by defining a start point and an end point in the test case.

4. The method in claim 1, wherein generating the automation accelerator script comprises creating the automation accelerator script in a file format that includes extensible markup language (XML).

5. The method in claim 1, further comprising executing the automation accelerator script to execute the test case.

6. The method in claim 1, further comprising creating a test data container when the automation accelerator script is executed.

7. The method in claim 5, wherein executing the automation accelerator script further comprises generating a test report, the test report containing a result of execution of the test case.

8. The method in claim 1, further comprising integrating the automation accelerator with a test automation tool.

9. The method in claim 8, wherein integrating the automation accelerator comprises communicating with an application programming interface of the test automation tool.

10. The method in claim 8 further comprising customizing the automation accelerator to create the automation accelerator script that is executable by the test automation tool for the test case.

11. The method in claim 5, wherein executing the automation accelerator script further comprises creating a variant of the test case.

12. The method in claim 5, wherein executing the test case comprises simulating the user action on the user interface.

13. The method in claim 5, wherein executing the automation accelerator script comprises executing the automation accelerator script in a record mode.

14. The method in claim 13, wherein executing the automation accelerator in the record mode comprises:
  capturing the user action on the user interface automatically; and
  creating the test case for the user action by selecting the user interface element and the operation performed on the user interface element automatically.

15. A computing system, comprising:
  one or more non-transitory memory devices, the memory devices having stored thereon instructions related to:
  a capturing unit to capture a user action including a set of user action attributes in a user action table, the user action on a user interface, the set of user action attributes includes a user interface element, an operation performed on the user interface element in the user action, a type of the user interface element, a value of the user interface element, and comments of the user action, and wherein the operation performed on the user interface element is selected from a group consisting of a click, a set, and a launch;
  a fetching unit to fetch the user interface element in the user interface as a first user action attribute into a first list and the operation performed on the user interface element as a second user action attribute into a second list;
  a test case creating unit to automatically create a test case without user intervention in an automation accelerator for the user action upon selecting the user interface element from the first list and the operation performed on the user interface element in the user action from the second list, wherein rest of the set of user action attributes are automatically updated in response to the selection;
  a script creating unit to create an automation accelerator script of the test case.

16. The system in claim 15, further comprising a test data container to persist a value of the user interface element.

17. The system in claim 16, wherein the capturing unit, the fetching unit, the test case creating unit, the automation accelerator script creating unit, the test data container, a user interface generating unit, and a test report generating unit are electronically coupled to a system bus.

18. The system in claim 15, further comprising a test report generating unit to generate a test report that contains a result of an execution of the test case.

19. An article of manufacture, comprising:
  a non-transitory computer readable storage medium having instructions which when executed by a machine cause the machine to execute a method comprising:
  capturing a user action on a user interface in a user action table, wherein the user action includes a set of user action attributes, the set of user action attributes including a user interface element, an operation performed on the user interface element in the user action, a type of the user interface element, a value of the user interface element, and comments of the user action, and wherein the operation performed on the user interface element is selected from a group consisting of a click, a set, and a launch;
  fetching the user interface element in the user interface as a first user action attribute into a first list and the operation performed on the user interface element as a second user action attribute into a second list;
  automatically creating a test case without user intervention in an automation accelerator for the captured user action from the user action table by selecting the user interface element from the first list and the operation performed on the user interface element performed in the user action from the second list;
  automatically updating rest of the set of user action attributes upon selecting the user interface element from the first list and the operation performed on the user interface element from the second list; and
  generating an automation accelerator script of the test case upon a save operation on the test case.

* * * * *